United States Patent
Betts

(10) Patent No.: US 6,975,694 B1
(45) Date of Patent: Dec. 13, 2005

(54) DIGITAL SUBSCRIBER LINE DRIVER

(75) Inventor: William L. Betts, St. Petersburg, FL (US)

(73) Assignee: Paradyne Corporation, Largo, FL (US)

( * ) Notice: Subject to any disclaimer, the term of this patent is extended or adjusted under 35 U.S.C. 154(b) by 712 days.

(21) Appl. No.: 09/733,841

(22) Filed: Dec. 7, 2000

Related U.S. Application Data

(60) Provisional application No. 60/170,988, filed on Dec. 15, 1999.

(51) Int. Cl.⁷ .............................................. H04K 1/10
(52) U.S. Cl. ...................................................... 375/360
(58) Field of Search .................... 375/219, 222, 375/260, 295, 316, 135, 136, 146, 147, 259, 229, 340, 261, 297, 298; 370/204, 207, 208, 210, 206, 209, 468; 708/402, 403, 404, 405

(56) References Cited

U.S. PATENT DOCUMENTS

| | | | | |
|---|---|---|---|---|
| 5,008,903 A | | 4/1991 | Betts et al. .................. 375/60 |
| 5,835,536 A | * | 11/1998 | May et al. .................. 375/260 |
| 6,134,274 A | * | 10/2000 | Sankaranarayanan et al. ... 375/295 |
| 6,243,414 B1 | * | 6/2001 | Drucker et al. .............. 375/222 |
| 6,307,889 B1 | * | 10/2001 | Chun ......................... 375/260 |
| 6,320,903 B1 | * | 11/2001 | Isaksson et al. ............ 375/232 |
| 6,389,062 B1 | * | 5/2002 | Wu ............................ 375/222 |
| 6,452,987 B1 | * | 9/2002 | Larsson et al. ............. 375/345 |
| 6,487,258 B1 | * | 11/2002 | Jedwab et al. ............. 375/340 |
| 6,498,807 B1 | * | 12/2002 | Hwang ...................... 375/222 |
| 6,522,731 B2 | * | 2/2003 | Matsumoto .............. 379/93.08 |
| 6,529,925 B1 | * | 3/2003 | Schenk ...................... 708/300 |
| 6,563,864 B1 | * | 5/2003 | Ibrahim et al. ............. 375/222 |
| 6,618,480 B1 | * | 9/2003 | Polley et al. .......... 379/406.05 |
| 6,621,346 B1 | * | 9/2003 | Nabicht et al. ............. 330/284 |
| 6,625,777 B1 | * | 9/2003 | Levin et al. ................. 714/774 |
| 6,674,768 B1 | * | 1/2004 | Okamura ................... 370/468 |
| 2001/0036233 A1 | * | 11/2001 | Laroia et al. ............... 375/286 |

* cited by examiner

*Primary Examiner*—Emmanuel Bayard
(74) *Attorney, Agent, or Firm*—Thomas, Kayden, Horstemeyer & Risley LLP

(57) ABSTRACT

A digital subscriber line (DSL) driver allows a transmitter to monitor its own transmit spectrum at the subscriber loop and adjust the transmit spectrum based on detected line conditions, affected by the presence of bridged taps or any other impedance variations. The transmit spectrum is preferably equalized so that all carriers, or tones, transmit using the same power and exhibit the same margin. The invention is applicable to DMT and single carrier modulation formats.

27 Claims, 6 Drawing Sheets

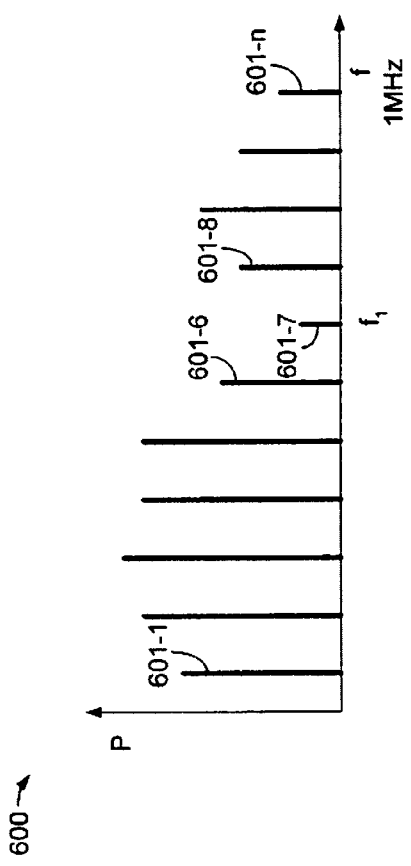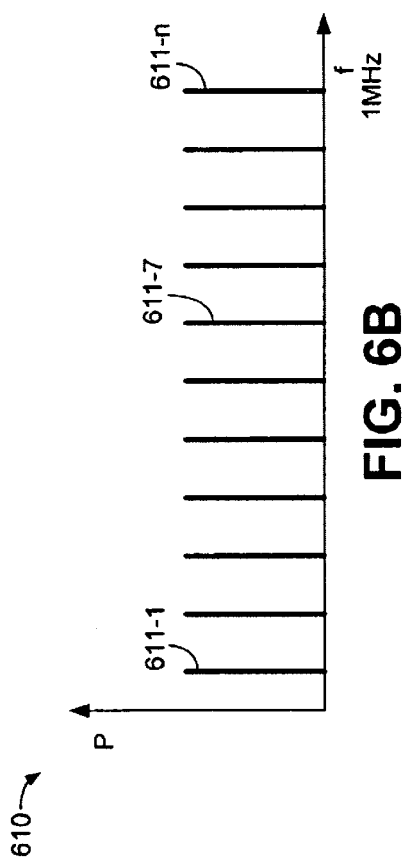

DIGITAL SUBSCRIBER LINE DRIVER

CROSS-REFERENCE TO RELATED APPLICATIONS

This document claims priority to and the benefit of the filing date of Provisional Application Ser. No. 60/170,988 entitled DISCRETE MULTI-TONE SUBSCRIBER LINE DRIVER, filed Dec. 15, 1999, which is hereby incorporated by reference.

TECHNICAL FIELD

The present invention relates generally to communications systems) and more particularly, to a subscriber line driver for a digital subscriber line (DSL) communications system.

BACKGROUND OF THE INVENTION

Data communication typically occurs as the transfer of information from one communication device to another. This is typically accomplished by the use of a modem located at each communication endpoint. In the past, the term modem denoted a piece of communication apparatus that performed a modulation and demodulation function, hence the term "modem". Today, the term modem is typically used to denote any piece of communication apparatus that enables the transfer of data and voice information from one location to another. For example, modern communication systems use many different technologies to perform the transfer of information from one location to another. Digital subscriber line (DSL) technology is one vehicle for such transfer of information. DSL technology uses the widely available subscriber loop, the copper wire pair that extends from a telephone company central office to a residential location, over which communication services, including the exchange of voice and data, may be provisioned. The subscriber loop includes two wires, which are commonly referred to as "tip" and "ring." Unfortunately, the subscriber loop may also include "bridged taps," which are unterminated subscriber loops and which present high impedance to communication devices coupled to the line.

DSL devices can be referred to as modems, or, more accurately, transceivers, which connect the telephone company central office to the user, or remote location, typically referred to as the customer premises (CP). DSL communication devices use different formats and different types of modulation schemes and achieve widely varying communication rates. However, even the slowest DSL communications devices achieve data rates far in excess of conventional point-to-point modems.

Some of the available modulation schemes include quadrature-amplitude modulation (QAM), carrierless amplitude/phase (CAP) and discrete multi-tone (DMT) modulation. In a DMT modulation scheme, a number of carriers, commonly referred to as "tones" are encoded with the information to be transmitted and communicated over the communications channel. This information in the form of data words is encoded into signal space constellations and then transmitted. In a typical DMT transmitter, 256 carrier tones are used to encode the data and are added together resulting in a very high peak signal power due to the high numerical peak resulting from the addition of the 256 tones. Contributing to this peak power is the DMT algorithm, which allows the power on individual tones, or carriers, to be increased by up to 2.5 dB to satisfy margin requirements. The number of bits encoded into a symbol on each carrier is selected to bring margin to within 3 dB of the specified margin. The margin is then further improved on selected carriers by boosting their transmit signal power. Unfortunately, this boost in power increases the peak transmit signal power.

Power consumption is further increased due to the use of square signal space constellations used in conventional DMT transmitters and the allowed +2.5 dB to −14.5 dB power variation allowed on each carrier tone. Square signal space constellations have an inherently high peak signal power due to the location of the highest power signal point. The peak signal power in conventional DMT transmitters is sufficiently high to cause saturation or clipping of the transmitter in normal operation, thus preventing the use of DMT based systems in dense central site locations. Conventional DMT allows a probability of clipping of $10^{-7}$. To combat this inherent deficiency, conventional DMT transmitters use expensive Reed-Solomon forward error correction encoders combined with bit-wise interleavers. Coders such as these induce a significant amount of throughput delay and are unsuitable for multi-point communication environments.

Another limitation of DMT is a lack of transmit equalization or pre-emphasis. An assumption in DSL is that a flat transmit spectrum is optimum given that cross-talk from similar systems is the primary line impairment. Unfortunately, this assumption disregards the unique impedance of each subscriber loop and may result in a non-flat transmit spectrum on the tip and ring wires of the subscriber loop.

The number of bits encoded on each DMT carrier is selected in whole bit increments to bring the margin associated with each tone to within 3 dB of the specified margin. Contributing to the peak power problem, the DMT modulation scheme allows the power on individual tones to be increased by up to 2.5 dB to satisfy margin requirements. While increasing the power on some tones, the system reduces the power on other tones to maintain the specified transmit power. This scheme of tone power variation is useful in instances where it may be desirable to turn off specified tones and allocate their power to other tones. Unfortunately, this tone powers variation results in spectrum management difficulties. Conventional DMT systems simply turn off specified tone carriers and increase others by the allowed 2.5 dB. Unfortunately, this results in the undesirable situation in which some carriers will be 2.5 dB hotter than necessary in certain spectral bands, resulting in undesirable cross-talk, while other carrier tones are switched off completely. The tones at the high end of the frequency spectrum are frequently switched off.

Cross talk between wire pairs in cable bundles or in dense equipment cabinets is the major contributor to degradation in DSL networks. Spectrum management schemes have been proposed to limit cross-talk by specifying a Power Spectrum Density (PSD) for all DSL transmitters. DMT allows PSD pass band ripple of +3.5 dB to accommodate the +2.5 dB power variation on individual tones. While currently allowed, a boost of 2.5 dB in power will effectively lower channel capacity by 2.5 dB on neighboring wire pairs, thereby nullifying any true gain that may have been anticipated. It is desirable to have a DMT system that can transmit a specified PSD with pass band ripple of less than 1 dB.

Thus, it would be desirable to have a DMT communication system capable of providing transmit spectrum equalization, thus reducing or eliminating the need to boost power on individual carriers.

SUMMARY

The invention is an improved system and method for communicating over a digital subscriber line.

The invention allows a transmitter to monitor its own transmit spectrum at the subscriber loop and adjust the transmit spectrum based on detected line conditions. The transmit spectrum is preferably equalized so that all carriers, or tones, transmit using the same power and exhibit the same margin. The invention is applicable to DMT and single carrier modulation formats.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 6A is a graph illustrating a conventional DMT transmit spectrum; and

FIG. 6B is a graph illustrating a DMT transmit spectrum after operation of the power and spectrum control feedback loop of FIG. 3.

DETAILED DESCRIPTION OF THE INVENTION

Although described with particular reference to an asymmetric digital subscriber line (ADSL) communication system using DMT modulation, the digital subscriber line driver of the invention can be implemented in any communication system.

Furthermore, the digital subscriber line driver can be implemented in software, hardware, or a combination thereof. In a preferred embodiment(s), selected portions of the digital subscriber line driver are implemented in hardware and software. The hardware portion of the invention can be implemented using specialized hardware logic. The software portion can be stored in a memory and be executed by a suitable instruction execution system (microprocessor). The hardware implementation of the digital subscriber line driver can include any or a combination of the following technologies, which are all well known in the art: a discrete logic circuit(s) having logic gates for implementing logic functions upon data signals, an application specific integrated circuit (ASIC) having appropriate logic gates, a programmable gate array(s) (PGA), a field programmable gate array (FPGA), etc.

Furthermore, the digital subscriber line driver software, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic or electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1A:
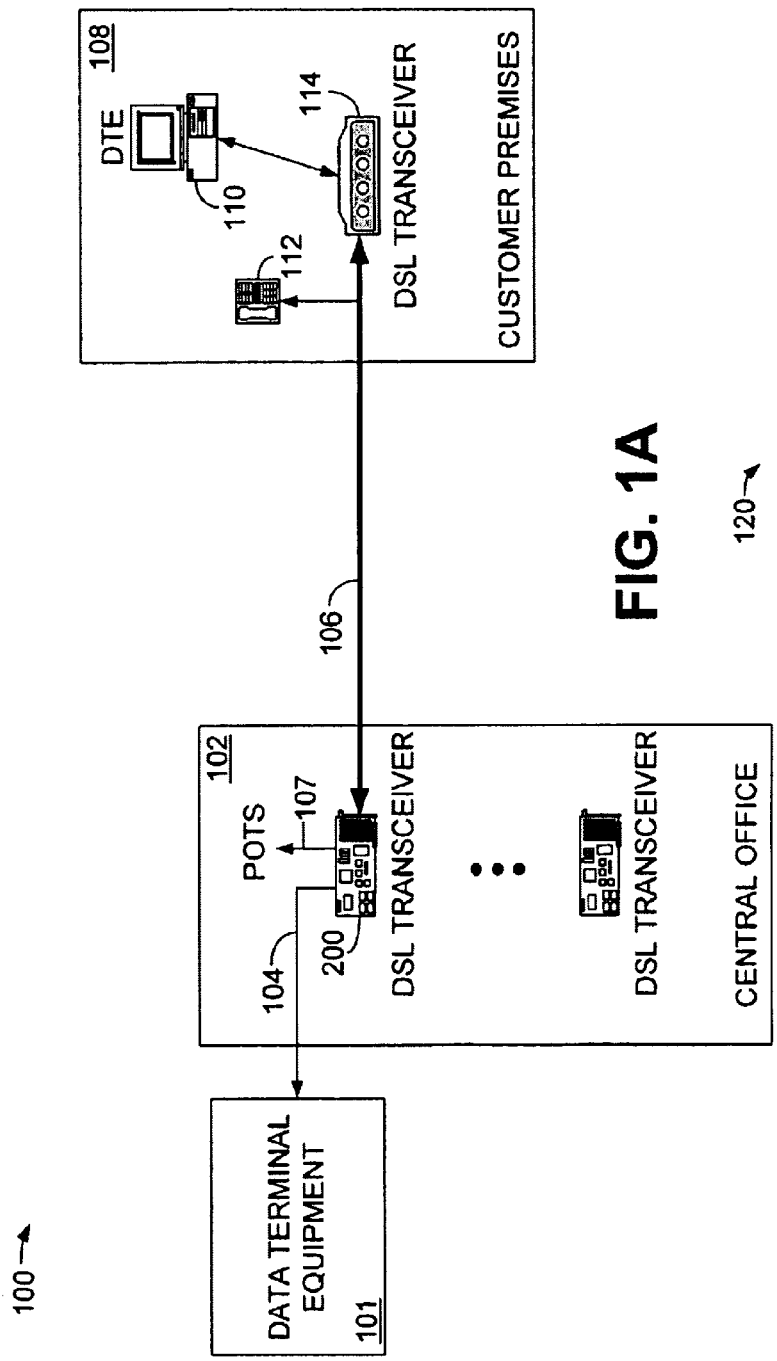
FIG. 1A is a block diagram illustrating the digital subscriber line communication environment in which the present invention resides.

Turning now to the drawings, FIG. 1A is a block diagram illustrating the digital subscriber line communication environment 100 in which the present invention resides. The DSL communication environment 100, for illustrative purposes only, is an asymmetric digital subscriber line (ADSL) communication environment. However, other DSL communication environments are contemplated by the invention. For example, the invention contemplates the use of symmetric DSL technologies such as high bit rate DSL (HDSL), symmetric DSL (SDSL), and multi-rate SDSL (MSDSL). Furthermore, the invention contemplates other asymmetric digital subscriber line technology such as rate adaptive DSL (RADSL).

Central office 102 connects to customer premises 108 via communication channel 106. Communication channel 106 can be the copper wire pair that typically extends between central office 102 and a remote customer location, and is commonly referred to as the "local loop," or "subscriber loop." For exemplar purposes only, the transmission scheme between central office 102 and customer premises 108 is point-to-point fill duplex ADSL, using discreet multi-tone (DMT) line coding. Other communication schemes are possible between central office 102 and customer premises 108, such as variations of multi-point and half duplex.

Central office 102 includes a number of DSL transceivers, an exemplar of one of which is illustrated using reference numeral 200. DSL transceiver 200 exchanges information with data terminal equipment (DTE) 101 via connection 104 and interfaces to communication channel 106 in order to communicate with DSL transceiver 114 located at customer premises 108. DTE 101 can be, for example, a computer to which the DTE 110 in customer premises 108 is communicating, or can represent access to the Internet.

DSL transceiver 114 located at customer premises 108 connects to DTE 110 and plain old telephone service (POTS) device 112 connects directly to communication channel 106. Although omitted for clarity, a POTS splitter is typically installed between the communication channel 106 and POTS device 112 to prevent the POTS device 112 from interfering with the DSL communication and to prevent DSL signals from degrading POTS performance. DTE 110 can be a personal computer and POTS device 112 can be a typical telephone. Typically, the DSL transceiver 114 is located in a home or office, and is used to allow simultaneous data communication (using DTE 110) and voice communication (using POTS device 112).

DSL transceiver 114 communicates over communication channel 106 with DSL transceiver 200 in order to exchange data information. Simultaneously with the data, voice information is transmitted over communication channel 106 and separated by DSL transceiver 200 via connection 107 and sent to typical telephone company POTS switching equipment (not shown). Data is exchanged between customer premises 108 and central office 102 in order to allow DTE 110 to access, for example, DTE 101, which may be an Internet access device provided by an internet service provider (ISP).

Although illustrated using a single customer premises 108 connected to central office 102, typically a number of customer premises locations will be connected to one central office 102 using a plurality of communication channels. Furthermore, it is also possible for a number of customer premises locations to be connected to one DSL transceiver located at a central office. However, for purposes of explanation, the invention will be described with reference to a single customer premises 108 communicating with a single DSL transceiver 200 located at central office 102. Furthermore, the invention described hereafter is embodied in both DSL transceiver 200 located at central office 102 and in DSL transceiver 114 located at customer premises 108. However, for ease of illustration, only a single DSL transceiver 200 will be described below.

Figure 1B:
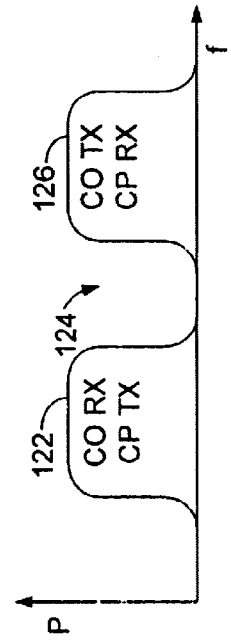
FIG. 1B is a graphical representation illustrating the frequency spectrum of the communication that occurs between the central office and the customer premises of FIG. 1A.

FIG. 1B is a graphical representation illustrating the frequency spectrum of the communication that occurs between central office 102 and customer premises 108 of FIG. 1A. The vertical axis of graph 120 represents transmission power and the horizontal axis of graph 120 represents frequency. Generally, the communication that occurs between DSL transceiver 200 and DSL transceiver 114 is divided by frequency, with the transmission from central office 102 toward customer premises 108 (downstream) occurring at a frequency higher than the transmission of information from DSL transceiver 114 located at customer premises 108 toward the DSL transceiver 200 located at central office 102 (upstream). For example, the curve indicated using reference numeral 122 represents upstream transmission from the customer premises 108 toward the central office 102, and the curve indicated using reference numeral 126 represents downstream transmission occurring from the central office 102 toward the customer premises 108. Transmission from the customer premises 108 toward the central office 102 is generally lower in frequency in order to avoid cross-talk that may occur as the signal gets nearer to the central office 102 and an increasing number of communication channels, such as channel 106, are bundled together in common cable bundles. Furthermore, although shown as a discreet difference in frequencies indicated by region 124 in FIG. 1B, it is possible that there is some overlap occurring between the curves 122 and 126. Further still, although shown as symmetric in nature for simplicity, the curves 122 and 126 may not appear identical. For example, the curve 122 might be higher in power and occur over a shorter frequency spectrum than curve 126.

Figure 2:
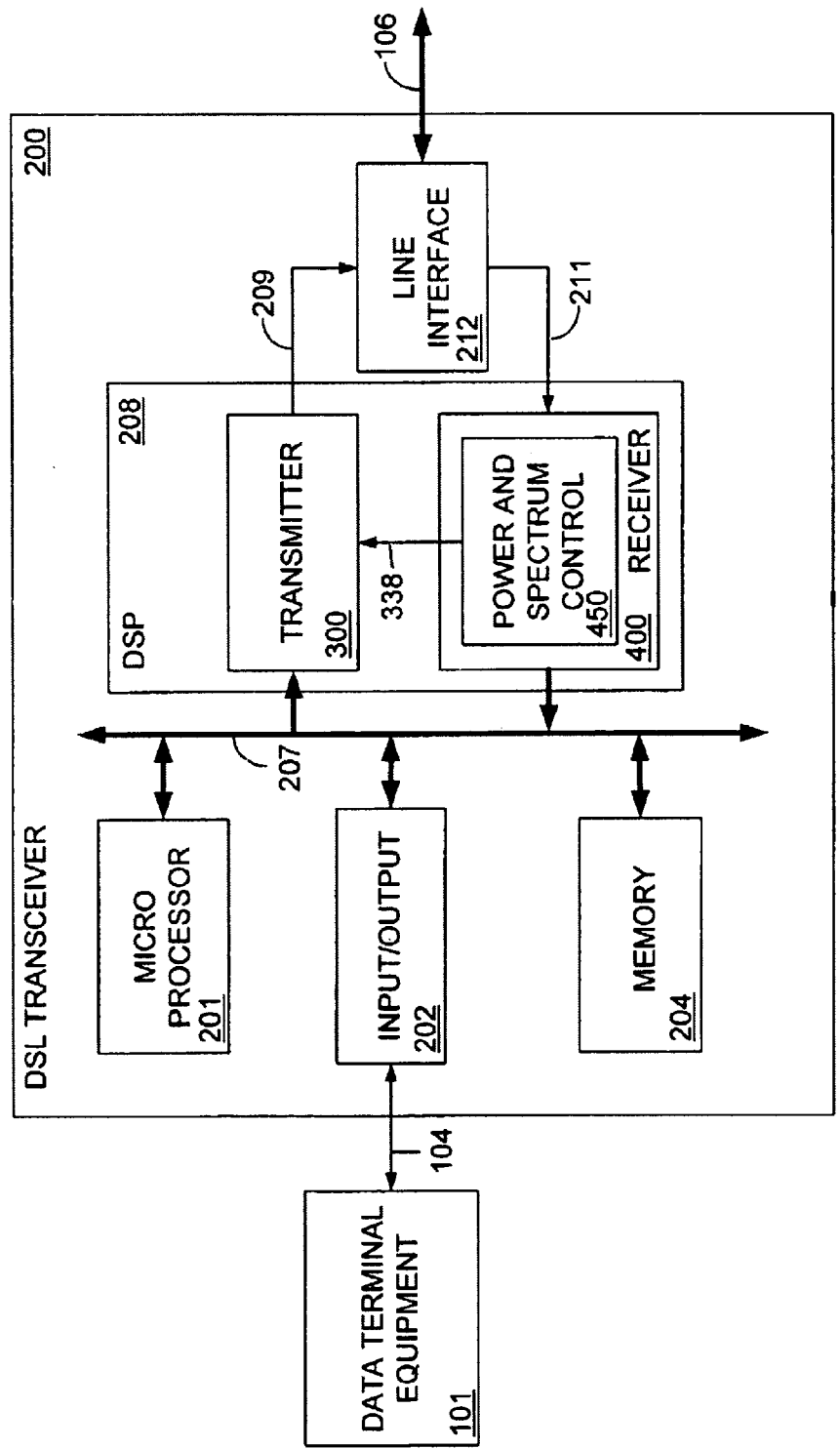
FIG. 2 is a block diagram illustrating the DSL transceiver of FIG. 1A.

FIG. 2 is a block diagram illustrating the DSL transceiver 200 of FIG. 1A The DSL transceiver 200 communicates with DTE 101 via connection 104 where data supplied to and received from DTE 101 is exchanged via input/output element 202 within DSL transceiver 200. DSL transceiver 200 also includes microprocessor 201 and memory 204 in communication via bus 207 with digital signal processor (DSP) 208. The memory 204 and the microprocessor 201 work in cooperation to store and execute the logic of the invention. In the absence of a microprocessor, the logic of the invention may be executed in the DSP 208. Although DSP 208 as illustrated includes the transmitter 300 and receiver 400 of the invention, the transmitter 300 and receiver 400 may be implemented separately. The receiver 400 includes the power and spectrum control feedback loop 450, which detects the transmit symbol at the output of the transmitter. The power and spectrum control feedback loop supplies carrier tone scaling signals via connection 338 to the transmitter 300 and will be described in greater detail below. Although shown for simplicity in FIG. 2 as a single connection, the connection 338 can be a plurality of connections, corresponding to the plurality of carrier tones modulated by the transmitter 300. The power and spectrum control feedback loop 450 can be considered part of a line driver, and resides in the receiver, but is used by the transmitter 300 during an initial transmission. The power and spectrum control feedback loop 450 is used to measure the power and analyze the transmit spectrum so that each of the carrier tones may be scaled, or optimized, to provide an efficient transmit spectrum.

Transmitter 300 communicates via connection 209 with line interface 212 in order to gain access to communication channel 106. Similarly, receiver 400 receives signals from line interface 212 via connection 211.

Figure 3:
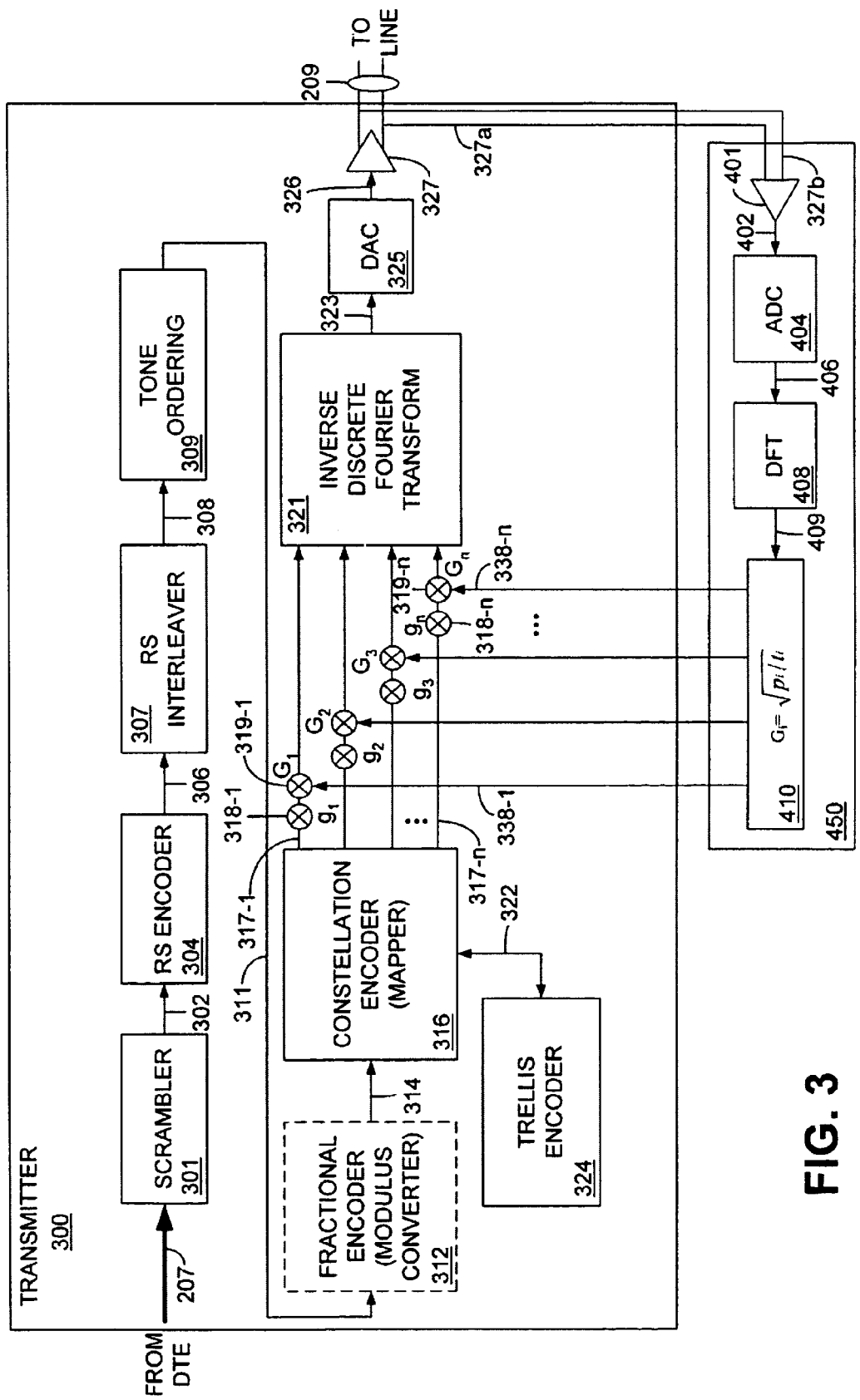
FIG. 3 is a block diagram illustrating the transmitter of FIG. 2, including the power and spectrum control feedback loop of the invention.

FIG. 3 is a block diagram illustrating the transmitter 300 of FIG. 2. A data signal originating in DTE 101 is communicated via bus 207 to scrambler 301. The signal on connection 207 is in the form of a serial bit stream and the scrambler 301 provides a scrambled serial bit stream on connection 302. The scrambler 301 can be either a self-synchronized scrambler or a preset free running scrambler as is known in the art. Depending upon the application, the preset scrambler may have some advantages, as in the case where Reed-Solomon coding is used. The scrambler 301 provides a scrambled m bit word on connection 302 to Reed-Solomon (RS) encoder 304. The RS encoder 304 operates on the scrambled m bit word on connection 302 to provide forward error correction and provides the Reed-Solomon encoded serial bit stream including the RS encoded m bit words on connection 306. The RS encoded serial bit stream on connection 306 is operated on by RS interleaver 307 to provide an interleaved Reed-Solomon encoded serial bit stream on connection 308.

The serial bit stream on connection 308 is then supplied to tone-ordering element 309. Tone-ordering element 309 orders the groups of bits contained in the serial bit stream on connection 308 into words that are to be encoded for each signal space constellation. Essentially, the tone-ordering element 309 groups the serial bit stream into bit-wise words, which will be encoded on each tone of the DMT transmission system. The output of the tone-ordering element 309 could be serial or parallel. In this embodiment, serial words are preferred. The tone-ordering element 309 precedes the fractional encoder 312, however, the order of these elements may be reversed.

The serial words on connection 311 are then sent to fractional encoder 312. Fractional encoder 312 is optional and can be used to encode a fractional, or non-integer number of bits onto each tone of the DMT transmitter 300 in accordance with that disclosed in commonly assigned, co-pending U.S. patent application Ser. No. 09/717,436, entitled "FRACTIONAL BIT RATE ENCODING IN A DISCRETE MULTI-TONE COMMUNICATION SYSTEM". Fractional encoder 312, if included, includes the logic necessary to encode fractional bits onto each of the n tones in the DMT communication scheme. The fractional encoder 312 operates on groups of words to encode a fractional (i.e., non-integer) number of bits on each tone. The fractional encoder 312 generates n constellations for n carrier tones simultaneously, in order to add a fraction of a bit to each carrier tone.

If the fractional encoder 312 is used, the fractionally encoded bit stream is supplied via connection 314 to constellation encoder 316. If the fractional encoder 312 is omitted, the output of the tone ordering element 309 is sent to the constellation encoder 316. The constellation encoder 316 encodes each word into a constellation for one carrier tone. Preferably, each word is mapped to a multi-dimensional circular signal space constellation. Circular signal space constellations are preferable because they allow an additional 0.2 dB of shaping gain, and an approximate 1.7 dB lower peak factor. Conventional DMT transmitters, by using square signal constellations, give up 0.2 dB worth of shaping gain available through the use of circular signal space constellations. This is so due to the lower peak factor available through the use of circular signal space constellations. The advantage in channel capacity of fractional bit encoding is 0.43 dB, deriving 0.2 dB from circular constellations and 0.23 dB from modulus conversion.

A trellis encoder 324 communicates via connection 322 with constellation encoder 316. The trellis encoder 324 operates sequentially on each word supplied via connection 314. The trellis encoder encodes from one tone to the next tone. Alternatively, a single carrier trellis encoder would encode from one symbol in time to the next symbol. Because DMT modulation is performed using discrete multiple carrier tones the trellis encoder encodes from one tone to the next tone.

The constellation encoder 316 supplies n constellations on n carrier tones represented using reference numerals 317-1 through 317-n. Although shown using only four tones in FIG. 3, typically constellation encoder 316 would encode 256 individual carrier tones with the 256 encoded tones comprising an encoded symbol. The constellations represent one phase and amplitude for each tone in parallel. The constellation encoder 316 encodes each word into a signal space constellation to be transmitted by the DMT transmitter. The plurality of tones, each with its respective signal space constellation, comprises a symbol that is transmitted. Each of the individual carrier tones on connections 317-1 through 317-n is supplied to a respective gain stage 318-1 through 31-n. The gain stages 318 ($g_1$–$g_n$) are part of a standard DMT transmitter and are augmented by respective subscriber line driver (SLD) gain scalars 319-1 through 319-n ($G_1$–$G_n$), which will be described below.

The output of each SLD gain scalar 319-1 through 319-n is supplied to inverse discrete Fourier transform (IDFT) element 321. The IDFT element 321 transforms the set of all tones (in parallel or taken together at one time) into a tone sequence of samples that are serially output on connection 323. The output on connection 323 is supplied to digital-to-analog converter (DAC) 325. The DAC 325 converts the digital domain signals on connection 323 to the analog domain on connection 326. The analog signal on connection 326 is amplified by differential transmit amplifier 327, which is the line driver for the transmitter 300, for transmission via connection 209 to the line interface 212 of FIG. 2 for transmission via communication channel 106. DAC 325 may include a filter (not shown) to help control the power spectrum density (PSD) for spectrum management.

The output of differential transmit amplifier 327 on connections 327a and 327b (commonly referred to as the "tip" and "ring" signals) is supplied to receive differential amplifier 401. The receive differential amplifier 401 is part of the power and spectrum control feedback loop 450, which is part of the receiver 400. The power and spectrum control feedback loop 450 also includes an analog-to-digital converter 404, discrete Fourier transform (DFT) element 408 and gain calculation element 410. Although the analog-to-digital converter 404, DFT element 408 and gain calculation element 410 within the power and spectrum control feedback loop 450 are contained within the receiver 400, these elements are used temporarily during start-up of the transmitter 300 and before they are used in the receiver 400. Alternatively, duplicate components can ensure that the power and spectrum control feedback loop 450 can operate at any time and indeed, may ensure that it can operate periodically throughout a communication session.

The receive differential amplifier 401 supplies the local amplified transmit signal (taken from the output of the transmitter 300) via connection 402 to the ADC 404. The ADC 404 converts the analog receive signal to the digital domain and supplies the digital samples via connection 406 to the DFT element 408. The DFT element 408 transforms the tone sequence of samples on connection 406 into a plurality of individual tones on connection 409. Although illustrated using a single connection, there are a plurality of signals, each having one tone, on connection 409. DFT element 408 may include adaptive phase and/or amplitude tracking for each tone. System timing may be recovered in DFT 408 by correlating phase changes on one pilot tone or across multiple tones. Each tone on connection 409 includes a symbol encoded in a circular signal space constellation.

The tones are supplied on connection 409 to gain calculation element 410. The gain calculation element 410 is used to compute local gain scalars $G_1$ through $G_n$ according to the formula $G_i = \sqrt{p_i/t_i}$, where $G_i$ is the local gain scalar, pi is the desired power spectral density (PSD) mask at the respective frequency and $t_i$ is the measured power of the tone. The local gain scalar $G_i$. (319-1 through 319-n) follows the DMT gain scalar $g_i$ (318-1 through 318-n) with the resultant gain scalar being $g_i$ $G_i$ for each tone. In this manner, the power and spectrum control feedback loop 450 ensures that the transmit PSD at the output of the transmitter 300 matches the desired PSD independently of non-ideal loop impedance, reactance, bridged taps, or any other impedance variation in the communication line. The power and spectrum control feedback loop 450 will allow the transmitter 300 to monitor for the occurrence of non-ideal attenuation at the transmit output (i.e., the tip and ring terminals) and perform spectrum correction before transmitting. The subscriber line driver provides transmit spectrum equalization, which will improve the performance of the transmitter and reduce the occurrence of power boost on individual carrier tones.

During start-up, one or more DMT symbols can be transmitted prior to the specified start-up sequence. A single symbol may be adequate because the power and spectrum control feedback loop 450 will be monitoring the transmitter 300. The resulting measured amplitude $t_i$ of each transmitted carrier tone is used to compute the new gain scalars $G_i$ for each tone. These new gain scalars are used throughout the remainder of the specified start-up process. The start-up process is local and need not involve communication with another DMT communication device.

As mentioned above, the subscriber line driver may be a one-time start-up process. However, the invention may be used to continuously monitor the quality of the transmit signal and make incremental improvements to maintain a constant PSD in response to changing line conditions, such as environmental drift of the loop properties caused by temperature, moisture, or other external stimulus that may be detectable at the local transmitter 300. Variation that is detectable at the transmitter 300 may otherwise impact the remote receiver. The power and spectrum control feedback loop 450 also allows multi-point operation.

Normal DMT line coding allows a remote receiver to specify the gain stages 318-1 through 318-$n$ ($g_1$–$g_n$) at the end of the start-up phase. After start-up, new single gain stages $g_i'=g_iG_i$ may be used during data transmission. When specified in decibels, the new gain is $g_i'$ dB=$g_i$dB+$G_i$dB. The gain stages $G_1$–$G_n$ remain because they were activated transparently before the start-up measurements were begun by the remote receiver. Thus, the remote receiver specifies $g_i$ relative to $G_1$ with the assumption that the $G_1$ will remain active. During start-up the gain $g_i$ is set at unity gain.

Figure 4:
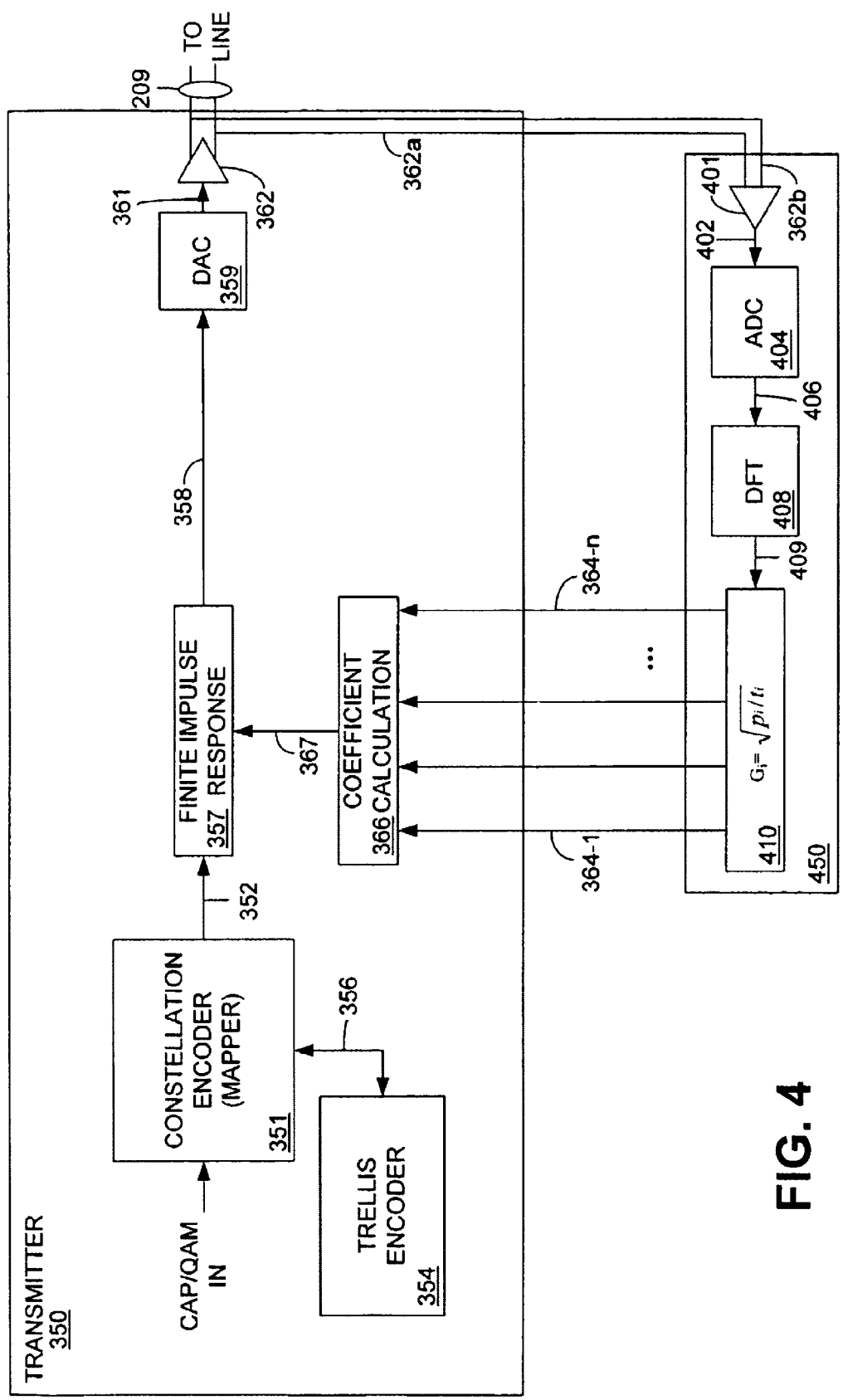
FIG. 4 is a block diagram illustrating an alternative embodiment of the transmitter of FIG. 2.

FIG. 4 is a block diagram illustrating an alternative embodiment 350 of the transmitter of FIG. 2. Transmitter 350 includes constellation encoder 351, which is supplied with a single carrier quadrature input signal, such as a carrierless amplitude/phase (CAP) modulation or a quadrature amplitude modulation (QAM) signal, or any other single carrier modulation scheme. The constellation encoder 351 encodes the supplied bit stream into a signal space constellation on connection 352.

A trellis encoder 354 communicates via connection 356 with constellation encoder 351. The trellis encoder 354 operates sequentially on each word supplied to the constellation encoder 351 similar to that described above with respect to trellis encoder 324. The trellis encoder encodes from one symbol in time to the next symbol.

The signal space constellation output of constellation encoder 351 on connection 352 is supplied to finite impulse response (FIR) filter 357. The FIR filter 357 provides the time domain transmit symbol on a single carrier via connection 358 to the DAC 359. The DAC 359 converts the digital signal on connection 358 to the analog domain for amplification by the transmit differential amplifier 362. The analog signal on connection 361 is amplified by differential transmit amplifier 362 for transmission via connection 209 to the line interface 212 of FIG. 2 for transmission via communication channel 106. DAC 359 may include a filter (not shown) to help control the PSD for spectrum management.

The output of differential transmit amplifier 362 on connections 362a and 362b (commonly referred to as the "tip" and "ring" signals) is supplied to receive differential amplifier 401 as described above with respect to FIG. 3. However, when used with the transmitter 350 of FIG. 4, the power and spectrum control feedback loop 450 provides a gain calculation value on each connection 364-1 through 364-$n$ to the coefficient calculation element 366. With single carrier modulation the gain values are calculated at any frequencies that are convenient for the DFT element 408 and span the bandwidth of the transmitter. The coefficient calculation element 366 provides the adaptive filter coefficients to the FIR filter 357 via connection 367. Coefficient calculation methods are well known in the art. One method is a straightforward inverse discrete Fourier transform. A variation on the inverse discrete Fourier transform method is known as frequency sampling filter coefficients. Another method for calculating the coefficients is described in commonly owned U.S. Pat. No. 5,008,903 entitled "ADAPTIVE TRANSMIT PRE-EMPHASIS FOR DIGITAL MODEM COMPUTED FROM NOISE SPECTRUM," issued on Apr. 16, 1991 to Betts et al.

Figure 5:
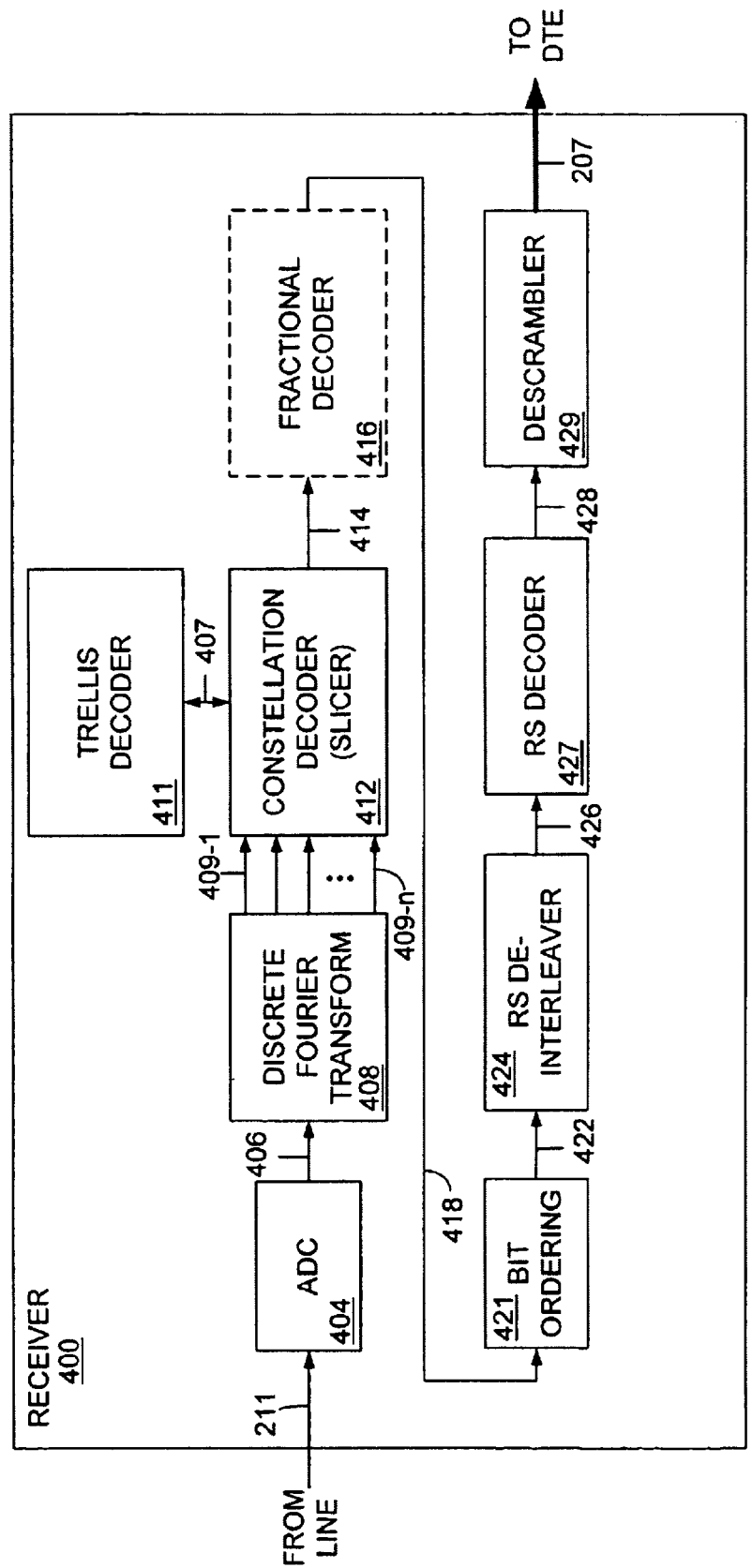
FIG. 5 is a block diagram illustrating the receiver 400 of FIG. 2.

FIG. 5 is a block diagram illustrating the receiver 400 of FIG. 2. A signal received on communication channel 106 is supplied via line interface 212 (FIG. 2) via connection 211 to analog-to-digital converter (ADC) 404. ADC 404 may include a filter (not shown) and/or equalizer (not shown) to help control undesirable signals and intersymbol interference. ADC 404 converts the analog signal received on connection 211 into a serial bit stream on connection 406. The serial bit stream on connection 406 is supplied to discreet Fourier transform (DFT) element 408. The DFT element 408 transforms the tone sequence of samples on connection 406 into a plurality of individual tones represented using reference numerals 409-1 through 409-$n$. DFT 408 may include adaptive phase and/or amplitude tracking for each tone. System timing may be recovered in DFT 408 by correlating phase changes on one pilot tone or across multiple tones. The tones 409-1 through 409-$n$ correspond to the tones 317-1 through 317-$n$ of FIG. 3. Each tone 409-1 through 409-$n$ includes a symbol encoded in a circular signal space constellation.

Each of the tones 409-1 through 409-$n$ are supplied to constellation decoder 412 which outputs an index representing the constellation point received for each of the tones. This serial group of indices is supplied via connection 414 to optional fractional decoder 416. The optional fractional decoder 416 converts the groups of indices, or words, into a new set of binary words, which are restored in their original order. Trellis decoder 411 communicates with constellation decoder 412 via connection 407.

The optional fractional decoder 416 supplies the serial words via connection 418 to bit ordering element 421. If the fractional decoder 416 is omitted, the constellation decoder 412 supplies the serial words on connection 414 directly to the bit ordering element 421. The bit ordering element 421 orders the bits into their original order and supplies the serial stream on connection 422 to RS de-interleaver 424, which de-interleaves the Reed-Solomon encoded bit stream. The de-interleaved bit stream is supplied on connection 426 to RS decoder 427. RS decoder 427 removes the Reed-Solomon forward error correction and supplies the scrambled bit stream via connection 428 to descrambler 429. Descrambler 429 descrambles the serial bit stream and supplies the original bit stream via connection 207 through the input/output element 202 (FIG. 2) to DTE 101.

FIG. 6A is a graph 600 illustrating a conventional DMT transmit spectrum. The vertical axis of graph 600 represents power and the horizontal axis represents frequency. The tones 601-1 through 601-$n$ illustrate that each tone in a DMT communication scheme is independently variable and adjustable depending on line conditions. Each tone 601-1 through 601-$n$ represents the power at that tone frequency. Further, tone 601-7 represents the presence of a bridged tap at frequency $f_1$. The bridged tap at frequency $f_1$ prevents the tone 601-7 from transmitting significant energy and also negatively affects the tones 601-6 and 601-8.

FIG. 6B is a graph 610 illustrating a DMT transmit spectrum after operation of the power and spectrum control feedback loop of FIG. 3. The graph 610 illustrates that each of the tones 611-1 through 611-$n$ is equalized, thus compensating the bridged tap represented by tone 601-7 in FIG. 6A and maintaining the specified PSD, which is a flat spectrum for the case illustrated in FIG. 6B.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

Therefore, at least the following is claimed:

1. An system for equalizing a discrete multi-tone (DMT) transmit spectrum, comprising:
   a DMT transmitter configured to generate a plurality of transmit carrier tones and apply a gain to each transmit carrier tone and combine the plurality of transmit carrier tones into a symbol and transmit the symbol; and
   a DMT receiver comprising:
      a receive line driver configured to receive the output of the DMT transmitter and to detect the transmitted symbol;
      a discrete Fourier transform (DFT) element configured to separate the detected symbol into a plurality of received carrier tones; and
      a gain calculation element configured to calculate at least a portion of the gain applied by the DMT transmitter to each of the plurality of transmit carrier tones, the gain based on a predefined transmit signal spectrum associated with each of the plurality of transmit carrier tones and on a power measurement of each of the received carrier tones.

2. The system of claim 1, where the DMT transmitter is further configured to produce a local transmit signal carrying the symbol and the receive line driver is further configured to receive the local transmit signal and to detect the transmitted symbol carried on the local transmit symbol.

3. The system of claim 1, wherein the gain adjustment element further comprises:
   logic configured to measure power on each of the plurality of received carrier tones; and
   logic configured to provide a local gain scalar for each of the plurality of transmit DMT carrier tones.

4. The system of claim 3, wherein the DMT transmitter is further configured to apply the local gain scalar to each transmit carrier tone in addition to a remote gain scalar provided by a remote modem.

5. The system of claim 3, wherein the DMT transmitter is further configured to apply the local gain scalar to each transmit carrier tone after applying a remote gain scalar provided by a remote modem.

6. The system of claim 3, wherein gain calculation element is further configured to use a remote transmit signal spectrum from a remote modem as the predefined signal spectrum.

7. The system of claim 1, wherein the receive line driver monitors local line conditions.

8. The system of claim 1, wherein the symbol is generated before a start-up sequence.

9. The system of claim 1, wherein the symbol is generated after a start-up sequence.

10. An system for equalizing a discrete multi-tone (DMT) transmit spectrum, comprising:
    a DMT receiver; and
    a DMT transmitter configured to generate a plurality of transmit carrier tones and combine the plurality of transmit carrier tones into a symbol and transmit the symbol,
    wherein the DMT receiver is configured to detect the transmitted symbol at the output of the DMT transmitter and to separate the detected symbol into a plurality of received carrier tones and to supply a plurality of carrier tone scaling signals to the transmitter,
    wherein the DMT transmitter is further configured to apply a gain to each transmit carrier tone before transmitting, the gain applied to each tone based on a corresponding one of the plurality of carrier tone scaling signals.

11. The system of claim 10, wherein the DMT receiver is further configured to measure power on each of the plurality of received carrier tones and to produce each of the plurality of carrier tone scaling signals based on the measured power on the corresponding received carrier tone.

12. The system of claim 10, wherein the DMT transmitter is further configured to apply the local gain scalar to each transmit carrier tone in addition to a remote gain scalar provided by a remote modem.

13. The system of claim 10, wherein the DMT transmitter is further configured to apply the local gain scalar to each transmit carrier tone after applying a remote gain scalar provided by a remote modem.

14. The system of claim 10, wherein the receive line driver monitors local line conditions.

15. A method for equalizing a discrete multi-tone (DMT) transmit spectrum, comprising:
    applying a local gain to each of a plurality of transmit carrier tones, the plurality of transmit carrier tones forming a symbol;
    producing a local transmit signal carrying the symbol;
    detecting the symbol carried on the local transmit signal;
    separating the detected symbol into a plurality of received carrier tones; and
    calculating at least a portion of the local gain, the calculated gain based on a predefined transmit signal spectrum associated with each of the plurality of transmit carrier tones and on a power measurement of each of the received carrier tones.

16. The method of claim 15, further comprising:
    receiving the predefined transmit signal spectrum from a remote modem.

17. The method of claim 15, further comprising:
    measuring power on each of the plurality of received carrier tones;
    calculating a local gain scalar for each of the plurality of transmit DMT carrier tones; and applying a local gain to each of a plurality of transmit carrier tones using a corresponding one of the local gain scalars.

18. A method for equalizing a discrete multi-tone (DMT) transmit spectrum, comprising:
    applying a local gain to at least one of a plurality of transmit carrier tones, the plurality of transmit carrier tones forming a symbol;
    producing a local transmit signal carrying the symbol;
    detecting the symbol carried on the local transmit signal;
    separating the detected symbol into a plurality of received carrier tones; and
    adjusting the local gain applied to the at least one transmit carrier tone, the calculated gain based on a predefined transmit signal spectrum associated with each of the plurality of transmit carrier tones and on a power measurement of each of the received carrier tones.

19. The method of claim 18, further comprising:
    calculating a received power level for each of the received carrier tones;

comparing the received power level of each received carrier tone with a predetermined power level; and adjusting the local gain applied to the at least one transmit carrier tone to match the predetermined power level.

20. The method of claim 19, further comprising:

adjusting the local gain applied to the at least one transmit carrier tone, using gain scalars, to match the predetermined power level.

21. The method of claim 18, further comprising:

monitoring a communication channel to detect impedance variations, wherein the adjusting step is responsive to the impedance variations.

22. An system for equalizing a discrete multi-tone (DMT) transmit spectrum, comprising:

means for applying a local gain to each of a plurality of transmit carrier tones, the plurality of transmit carrier tones forming a symbol;

means for producing a local transmit signal carrying the symbol;

means for detecting the symbol carried on the local transmit signal;

means for separating the detected symbol into a plurality of received carrier tones; and means for calculating at least a portion of the local gain, the calculated gain based on a predefined transmit signal spectrum associated with each of the plurality of transmit carrier tones and on a power measurement of each of the received carrier tones.

23. The system of claim 22, further comprising:

means for receiving the predefined transmit signal spectrum from a remote modem.

24. The system of claim 22, further comprising:

means for measuring power on each of the plurality of received carrier tones;

means for calculating a local gain scalar for each of the plurality of transmit DMT carrier tones; and means for applying a local gain to each of a plurality of transmit carrier tones using a corresponding one of the local gain scalars.

25. The system of claim 22, wherein the symbol is generated before a start-up sequence.

26. The system of claim 22, wherein the symbol is generated after a start-up sequence.

27. The system of claim 22, further comprising means for monitoring local line conditions.

* * * * *

UNITED STATES PATENT AND TRADEMARK OFFICE
CERTIFICATE OF CORRECTION

PATENT NO. : 6,975,694 B1
DATED : December 13, 2005
INVENTOR(S) : Betts

It is certified that error appears in the above-identified patent and that said Letters Patent is hereby corrected as shown below:

Column 4,
Line 51, delete "fill" and insert -- full --.

Column 8,
Line 43, delete "pi" and insert -- $P_i$ --.

Signed and Sealed this

Twenty-third Day of May, 2006

JON W. DUDAS
*Director of the United States Patent and Trademark Office*